US012343833B2

(12) United States Patent
Thorson et al.

(10) Patent No.: US 12,343,833 B2
(45) Date of Patent: *Jul. 1, 2025

(54) POWER TOOL INCLUDING A BATTERY PACK ISOLATION SYSTEM

(71) Applicant: MILWAUKEE ELECTRIC TOOL CORPORATION, Brookfield, WI (US)

(72) Inventors: Troy C. Thorson, Cedarburg, WI (US); Jeffrey M. Wackwitz, Waukesha, WI (US); Andrew J. Weber, Cudahy, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,724

(22) Filed: Oct. 30, 2023

(65) Prior Publication Data

US 2024/0058912 A1 Feb. 22, 2024

Related U.S. Application Data

(63) Continuation of application No. 18/152,549, filed on Jan. 10, 2023, now Pat. No. 11,845,153, which is a continuation of application No. 17/408,602, filed on Aug. 23, 2021, now Pat. No. 11,571,776, which is a continuation of application No. 16/287,807, filed on (Continued)

(51) Int. Cl.
*B23Q 11/00* (2006.01)
*B25F 5/00* (2006.01)

(52) U.S. Cl.
CPC .......... *B23Q 11/0032* (2013.01); *B25F 5/006* (2013.01)

(58) Field of Classification Search
CPC ...... B25F 5/006; B23Q 11/0032; Y02E 60/10
See application file for complete search history.

(56) References Cited

U.S. PATENT DOCUMENTS 4,032,806 A 6/1977 Seely
5,208,525 A 5/1993 Lopic et al.

(Continued)

FOREIGN PATENT DOCUMENTS

CN 102990620 A 3/2013
DE 102011101075 A1 11/2012

OTHER PUBLICATIONS

English Translation of Chinese Patent Office Action for Application No. 201410189771X dated Jun. 30, 2015, 13 pages.

(Continued)

*Primary Examiner* — Thomas M Wittenschlaeger
(74) *Attorney, Agent, or Firm* — Michael Best & Friedrich LLP

(57) ABSTRACT

A power tool includes a housing, a motor positioned substantially within the housing, a drive mechanism supported by the housing and coupled to the motor, a battery pack electrically coupled to the motor, and an isolation system. The isolation system includes an interface member positioned substantially within the housing. The interface member receives a portion of the battery pack to electrically couple the battery pack to the motor. The isolation system also includes a plurality of isolators coupled between the housing and the interface member to isolate the battery pack from the housing during operation of the power tool.

19 Claims, 5 Drawing Sheets

Related U.S. Application Data

Feb. 27, 2019, now Pat. No. 11,117,234, which is a continuation of application No. 14/270,547, filed on May 6, 2014, now Pat. No. 10,232,479.

(60) Provisional application No. 61/820,032, filed on May 6, 2013.

(56) References Cited

U.S. PATENT DOCUMENTS

| | | | |
|---|---|---|---|
| 5,401,591 | A | 3/1995 | Bishay et al. |
| 5,401,592 | A | 3/1995 | Gilpin et al. |
| 5,441,828 | A | 8/1995 | Akazawa et al. |
| 5,553,675 | A | 9/1996 | Pitzen et al. |
| 5,843,595 | A | 12/1998 | Kawakatsu |
| 6,066,938 | A | 5/2000 | Hyodo et al. |
| 6,350,149 | B1 | 2/2002 | Nakane |
| 6,460,626 | B2 | 10/2002 | Carrier |
| 6,502,949 | B1 | 1/2003 | Horiyama et al. |
| 7,429,189 | B2 | 9/2008 | Lerch |
| 7,504,176 | B2 | 3/2009 | Axelrod |
| 7,589,500 | B2 | 9/2009 | Johnson et al. |
| 7,686,853 | B2 | 3/2010 | Seman, Jr. et al. |
| 7,766,097 | B2 | 8/2010 | Kondo |
| 7,828,185 | B2 | 11/2010 | Hofmann et al. |
| 7,879,479 | B2 | 2/2011 | Roehm et al. |
| 7,944,181 | B2 | 5/2011 | Johnson et al. |
| 8,062,060 | B2 | 11/2011 | Rejman |
| 8,092,932 | B2 | 1/2012 | Phillips et al. |
| 8,123,098 | B2 * | 2/2012 | Miyata ..................... B25C 1/08 429/96 |
| 8,148,000 | B2 | 4/2012 | Furuta et al. |
| 8,225,978 | B2 | 7/2012 | Gross et al. |
| 8,240,395 | B2 | 8/2012 | Kamegai et al. |
| 8,278,877 | B2 | 10/2012 | Muruyama et al. |
| 8,695,862 | B2 | 4/2014 | Wu et al. |
| 10,160,111 | B2 | 12/2018 | Blickle et al. |
| 2005/0058890 | A1 | 3/2005 | Brazell et al. |
| 2008/0099224 | A1 | 5/2008 | Hofmann et al. |
| 2008/0124615 | A1 | 5/2008 | Matsumoto |
| 2008/0226971 | A1 | 9/2008 | Stickel |
| 2008/0302552 | A1 * | 12/2008 | Kondo .................... B25F 5/006 173/217 |
| 2009/0286143 | A1 | 11/2009 | Matthias et al. |
| 2010/0209759 | A1 | 8/2010 | Rejman et al. |
| 2010/0314147 | A1 | 12/2010 | Müller et al. |
| 2011/0042117 | A1 | 2/2011 | Doege et al. |
| 2012/0171539 | A1 | 7/2012 | Rejman et al. |
| 2012/0251857 | A1 | 10/2012 | Neuhold et al. |
| 2012/0291294 | A1 | 11/2012 | Middleton et al. |
| 2013/0196203 | A1 | 8/2013 | Wackwitz et al. |
| 2015/0328764 | A1 | 11/2015 | Yoshikane et al. |
| 2015/0357612 | A1 * | 12/2015 | Uchida ............... H01M 50/213 429/99 |
| 2019/0001477 | A1 | 1/2019 | Ullrich et al. |
| 2019/0193223 | A1 | 6/2019 | Thorson et al. |

OTHER PUBLICATIONS

English Translation of Chinese Patent Office Action for Application No. 201410189771X dated Mar. 11, 2016, 16 pages.

* cited by examiner 10
34B 42
78
110B
98
78
78
98
86
90
102
114
102
74
82
94
94
86
90
78
78
78
70
38
34A
106
106
106

POWER TOOL INCLUDING A BATTERY PACK ISOLATION SYSTEM

CROSS-REFERENCE TO RELATED APPLICATIONS

This application is a continuation of U.S. patent application Ser. No. 18/152,549, filed Jan. 10, 2023, now U.S. Pat. No. 11,845,153, which is a continuation of U.S. patent application Ser. No. 17/408,602, filed Aug. 23, 2021, now U.S. Pat. No. 11,571,776, which is a continuation of U.S. patent application Ser. No. 16/287,807, filed Feb. 27, 2019, now U.S. Pat. No. 11,117,234, which is a continuation of U.S. patent application Ser. No. 14/270,547, filed May 6, 2014, now U.S. Pat. No. 10,232,479, which claims priority to U.S. Provisional Patent Application No. 61/820,032, filed May 6, 2013, the entire contents of each are incorporated herein by reference.

BACKGROUND

The present invention relates to power tools and, more particularly, to battery pack isolation systems for power tools.

Power tools (e.g., reciprocating saw, drill, circular saw, jigsaw, etc.) generate vibrational forces during operation of the power tool. By nature, some power tools (e.g., reciprocating saws) generate more aggressive vibrational forces than other power tools (e.g., drills). It is advantageous to isolate the vibrational forces within the power tools so that the vibration forces do not propagate to a battery pack that powers the power tools. Excess vibrational forces exerted on the battery pack can limit the life cycle of the battery pack.

SUMMARY

In one embodiment, the invention provides a power tool including a housing, a motor positioned substantially within the housing, a drive mechanism supported by the housing and coupled to the motor, a battery pack electrically coupled to the motor, and an isolation system. The isolation system includes an interface member positioned substantially within the housing. The interface member receives a portion of the battery pack to electrically couple the battery pack to the motor. The isolation system also includes a plurality of isolators coupled between the housing and the interface member to isolate the battery pack from the housing during operation of the power tool.

In another embodiment, the invention provides an isolation system for a power tool. The power tool includes a housing, a motor positioned substantially within the housing, a drive mechanism supported by the housing and coupled to the motor, and a battery pack electrically coupled to the motor. The isolation system includes an interface member positioned substantially within the housing. The interface member is configured to receive a portion of the battery pack to electrically couple the battery pack to the motor. The isolation system also includes a plurality of isolators coupled between the housing and the interface member to isolate the battery pack from the housing during operation of the power tool.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
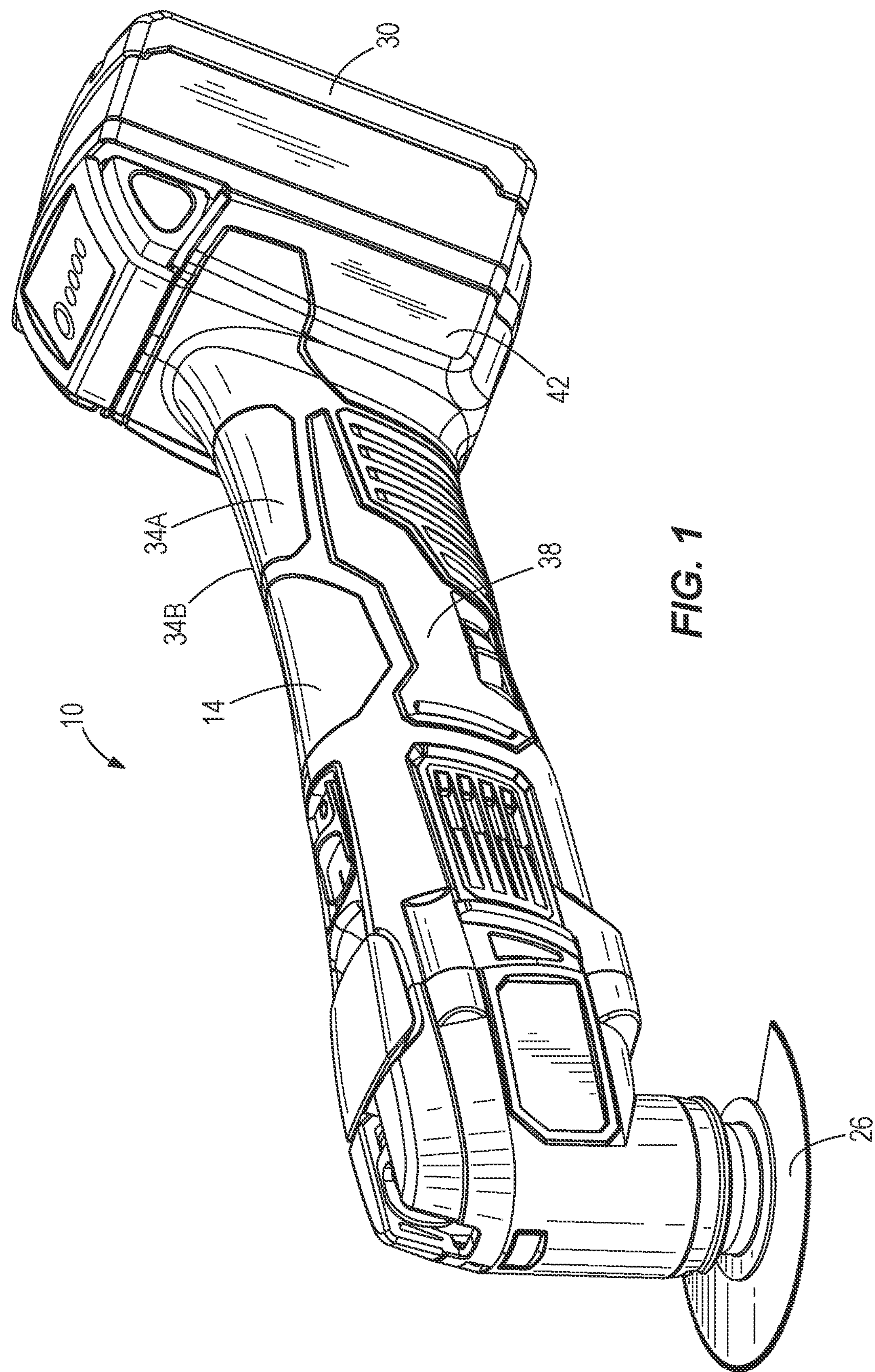
FIG. 1 is a perspective view of a power tool including a battery pack isolation system.
Figure 2:
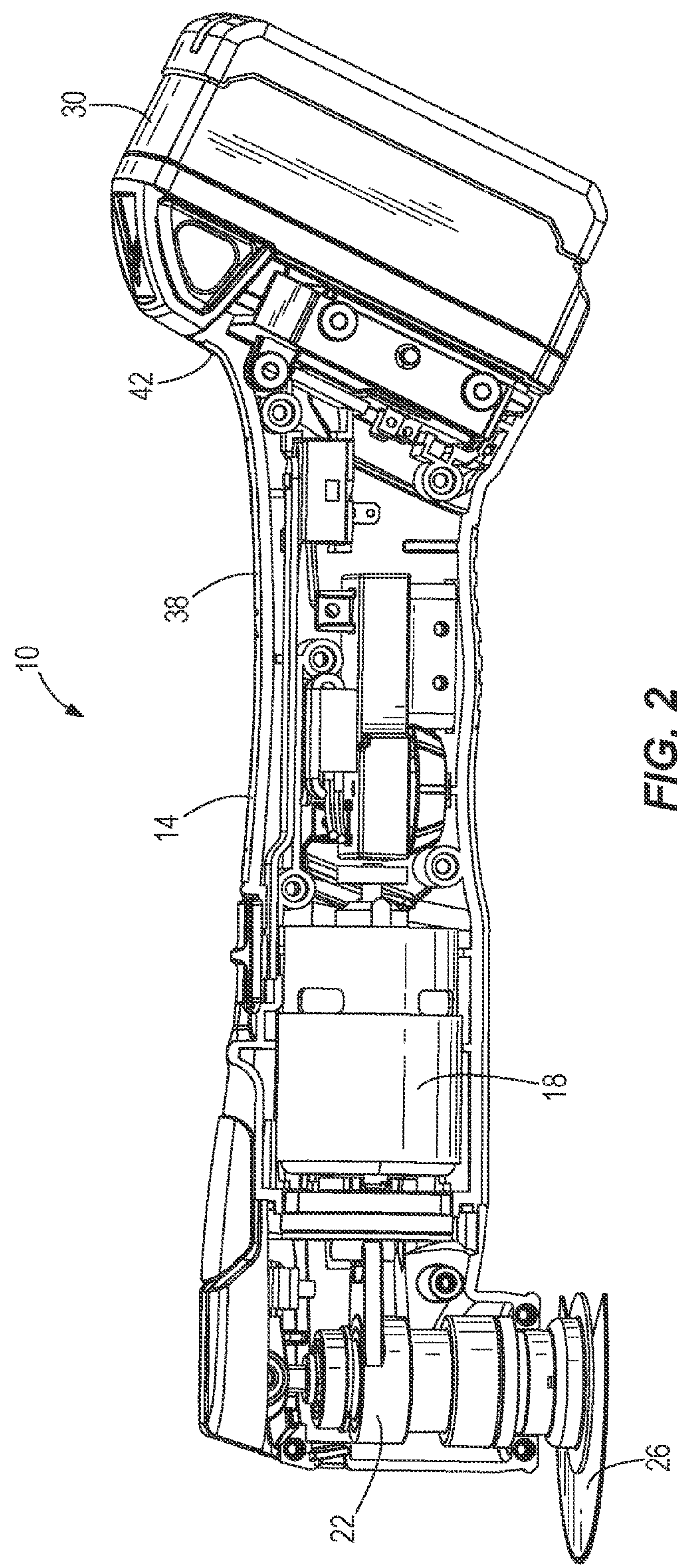
FIG. 2 is a side view of the power tool with a portion of a housing removed.

FIGS. 1 and 2 illustrate a power tool 10. The illustrated power tool 10 is a multi-tool operable to oscillate a cutting blade, a scraping blade, a sanding sheet, and the like. In other embodiments, the power tool 10 may be, for example, a reciprocating saw, a drill, a circular saw, a jigsaw, a band saw, a screwdriver, an angle or straight grinder, a hammer drill, or an impact wrench. In such embodiments, the power tool 10 may be operable to oscillate, rotate, reciprocate, or otherwise drive other types of output elements such as drill bits, saw blades, and the like.

The illustrated power tool 10 includes a housing 14, a motor 18, a drive mechanism 22, an output element 26, and a battery pack 30. The housing 14 includes two clamshell halves 34A, 34B that are connected together to enclose the motor 18 and the drive mechanism 22. When connected together, the clamshell halves 34A, 34B define a grip portion 38 and a battery support portion 42 of the housing 14. The grip portion 38 is configured to be grasped by a user during operation of the power tool 10. The battery support portion 42 is configured to indirectly support the battery pack 30 on the housing 14, as further described below.

As shown in FIG. 2, the motor 18 and the drive mechanism 22 are positioned substantially within the housing 14 in front of the grip portion 38. In some embodiments, the drive mechanism 22 is positioned within a gear case inside of and/or supported by the housing 14. The drive mechanism 22 is coupled to the motor 18 to be driven by the motor 18. When energized, the motor 18 drives the drive mechanism 22 to oscillate the output element 26.

The output element 26 is coupled to an output shaft or spindle (not shown) of the drive mechanism 22. The illustrated output element 26 is located at an opposite end of the housing 14 from the battery pack 30, but may alternatively be located in other locations on the housing 14 relative to the battery pack 30. In the illustrated embodiment, the output element 26 is a cutting blade that is oscillated during operation of the power tool 10. In other embodiments, the output element 26 may be a different type of element (e.g., a scraping blade, a sanding sheet, etc.) and/or may be driven in a different manner (e.g., rotated, reciprocated, etc.) by the drive mechanism 22.

The battery pack 30 is supported at the battery support portion 42 of the housing 14 and electrically coupled to the motor 18. During operation of the power tool 10, the battery pack 30 supplies power to the motor 18 to energize the motor 18. The illustrated battery pack 30 is an 18 volt Li-ion power tool battery pack. In other embodiments, the battery pack 30 may have different voltages (e.g., 12 volts, 14.4 volts, 28 volts, etc.) and/or chemistries (e.g., NiCd, NiMH, etc.).

Figure 3:
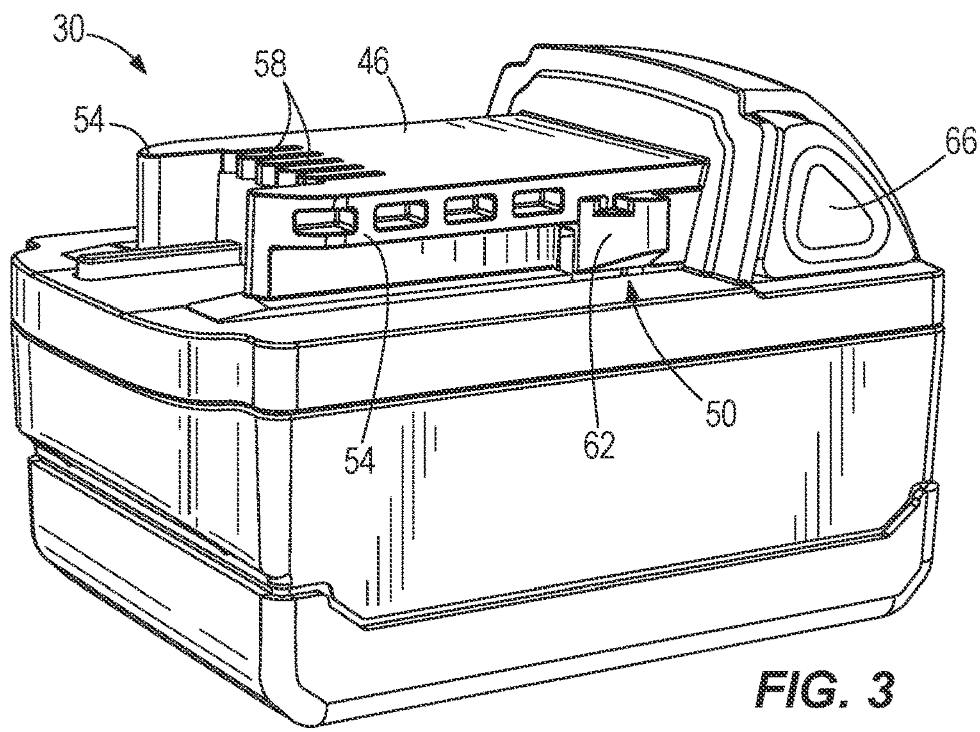
FIG. 3 is a perspective view of a battery pack of the power tool.

As shown in FIG. 3, the battery pack 30 includes a connection portion 46 and a securing mechanism 50. In the illustrated embodiment, the connection portion 46 includes two parallel, spaced apart rails 54 such that the battery pack 30 is a slide-on-style battery pack. In other embodiments, the battery pack 30 may be a tower-style battery pack that is at least partially inserted into the housing 14 of the power tool 10. The connection portion 46 also includes terminals 58 to electrically connect the battery pack 30 to a motor or other device. The securing mechanism 50 includes two latches 62 (only one of which is shown) for releasably securing the battery pack 30 to the power tool 10. The latches 62 extend from the connection portion 46 adjacent the rails 54. An actuator 66 is coupled to each latch 62 to facilitate manually operating (e.g., moving) the latches 62 relative to the connection portion 46.

Figure 4:
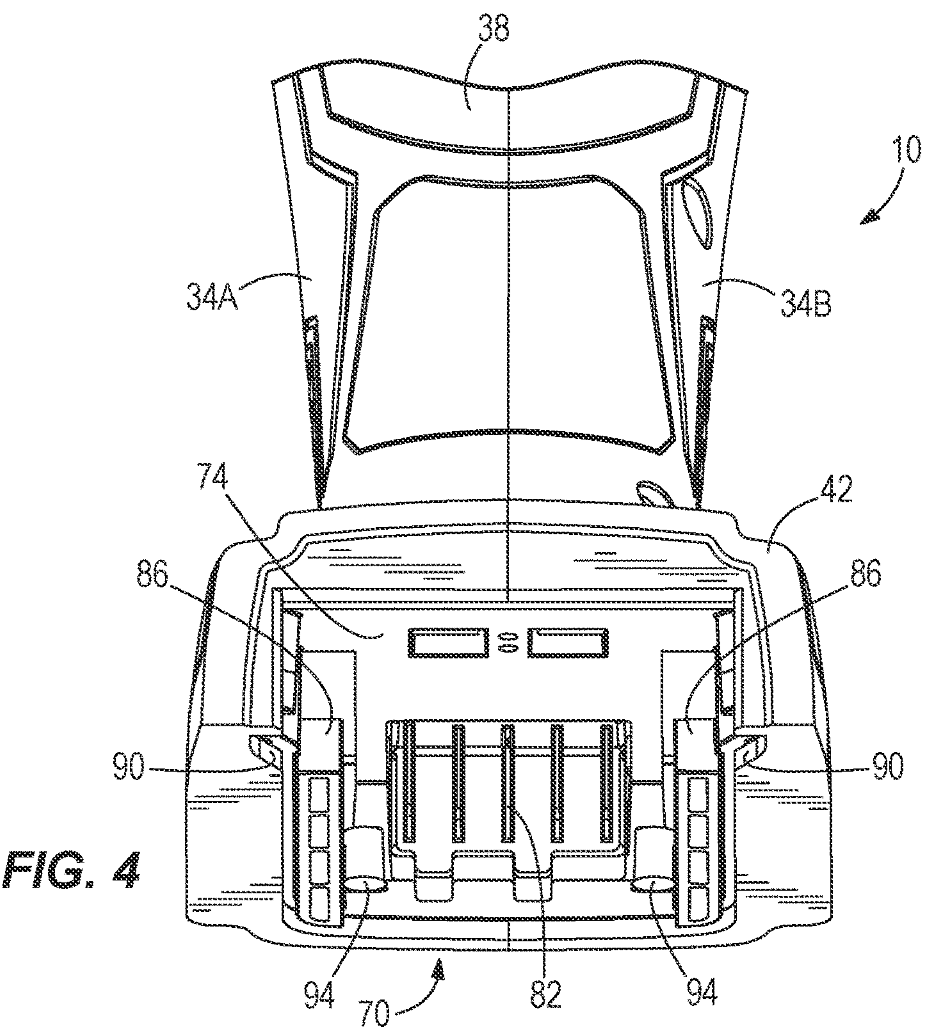
FIG. 4 is an end perspective view of a portion of the power tool without the battery pack.
Figure 5:
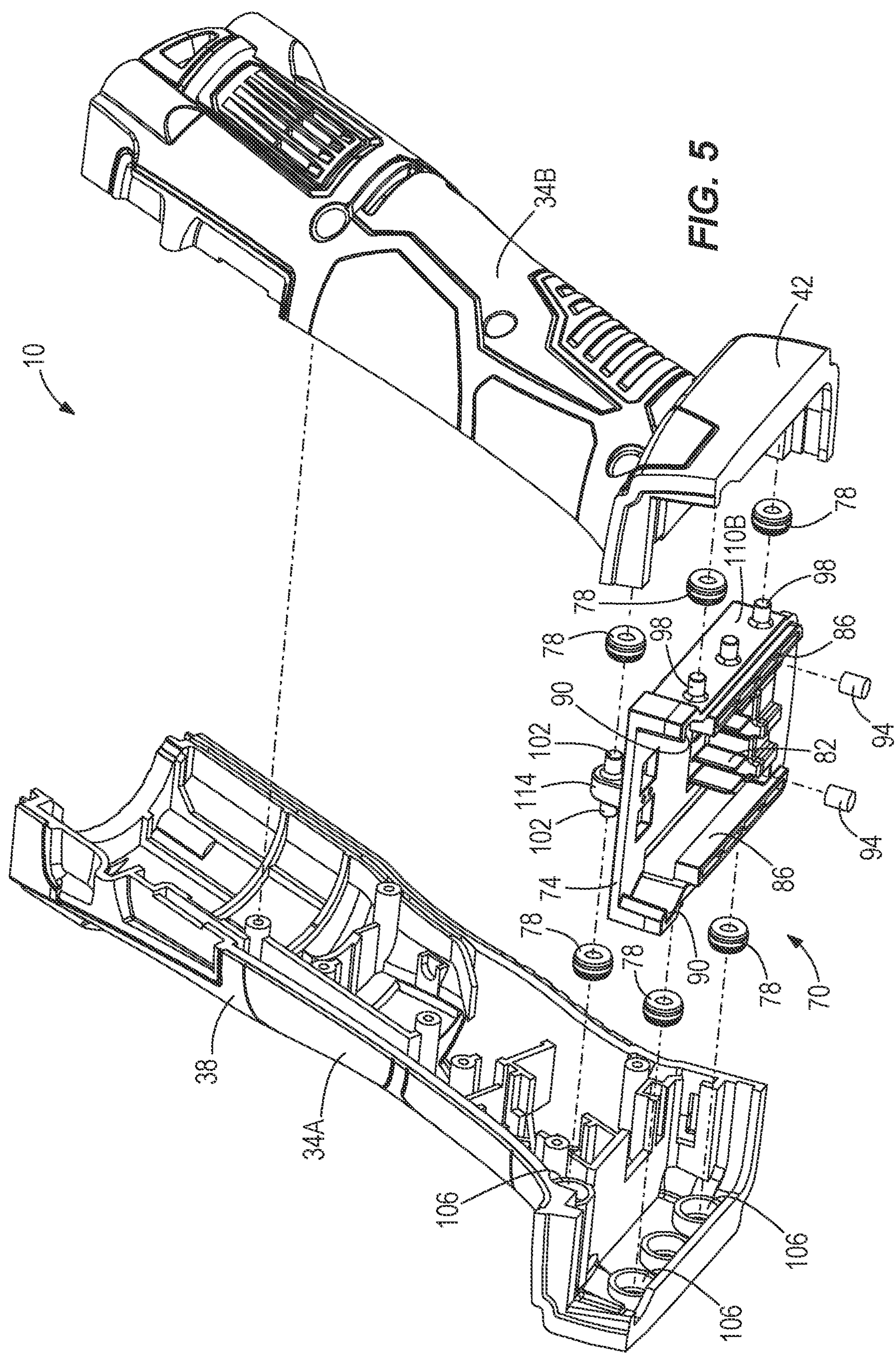
FIG. 5 is an exploded perspective view of a portion of the power tool including the battery pack isolation system.
Figure 6:
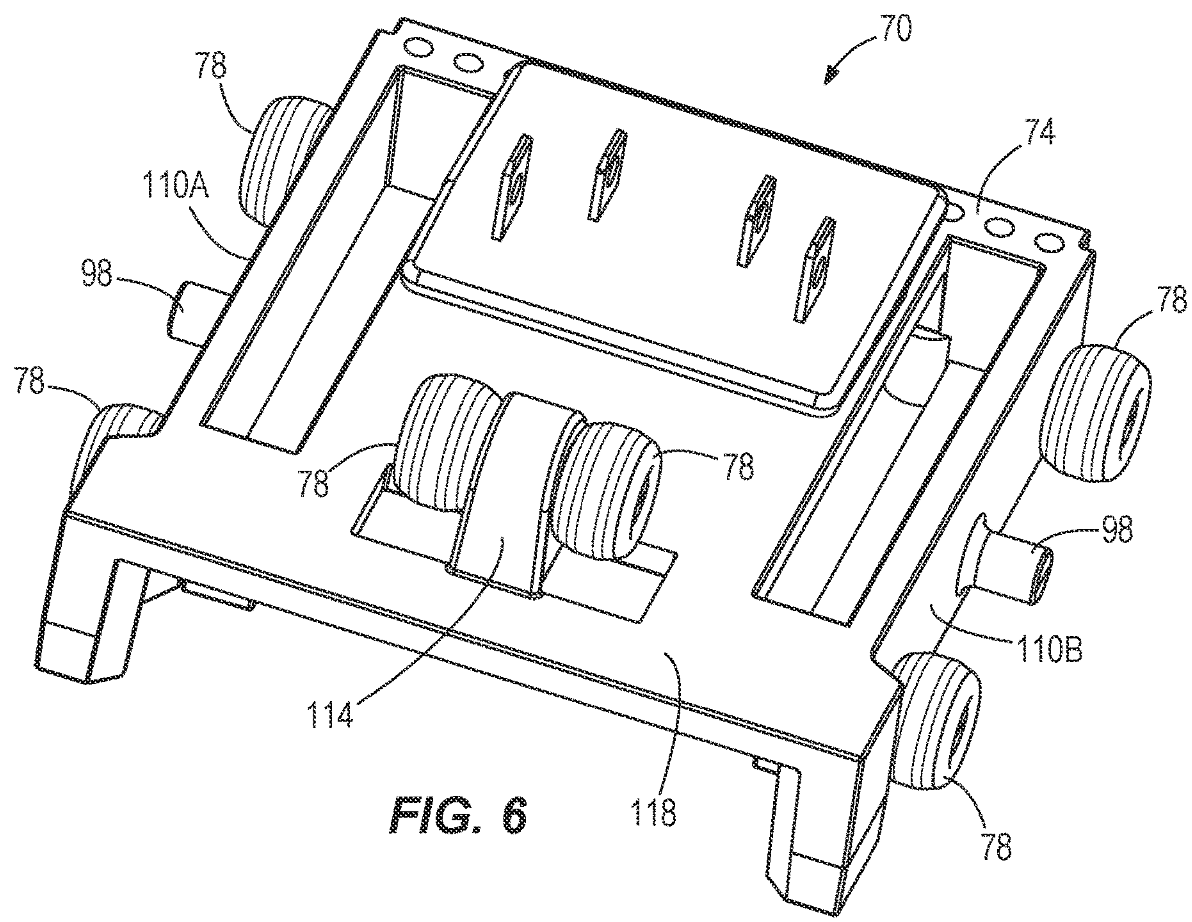
FIG. 6 is a perspective view of the battery pack isolation system.

As shown in FIGS. 4-6, the power tool 10 also includes an isolation system 70 to connect the battery pack 30 to the housing 14. The isolation system 70 mechanically isolates the battery pack 30 from the housing 14 during operation of the power tool 10. That is, in contrast to a damping system that reduces the magnitude of vibrations that are transferred to a battery pack, the isolation system 70 isolates the battery pack 30 from at least some vibrations caused by the motor 18 and the drive mechanism 22. The overall transfer of vibrations, particularly high frequency vibrations, to the battery pack 30 during operation of the power tool 10 is greatly reduced. The isolation system 70 is configured to allow the housing 14 to move in six degrees of freedom (i.e., forward-backward, up-down, and side-to-side) relative to the battery pack 30 such that certain frequencies of vibrations are not transferred to the battery pack 30, regardless of the direction of that particular vibration.

The illustrated isolation system 70 includes an interface member 74, isolators 78, and a terminal block 82. As shown in FIGS. 4 and 5, the interface member 74 is captured between the two clamshell halves 34A, 34B of the housing 14. The illustrated interface member 74 includes two parallel, spaced apart rails 86 that correspond to the rails 54 (FIG. 3) of the battery pack 30. The interface rails 86 are configured to engage the battery pack rails 54 to connect and support the battery pack 30 on the housing 14. The interface member 74 also defines two recesses 90 adjacent the rails 86. The recesses 90 are configured to receive the latches 62 (FIG. 3) of the battery pack 30 to releasably secure the battery pack 30 to the interface member 74. In other embodiments, the interface member 74 may be configured to receive a tower-style battery pack and/or battery packs having different securing mechanisms.

The interface member 74 also includes two elastomeric members 94 positioned adjacent the rails 86 on either side of the terminal block 82. The elastomeric members 94 are positioned adjacent opposite ends of the rails 86 from the recesses 90 that receive the battery pack latches 62. Stated another way, the elastomeric members 94 are position at a closed end of the interface member 74 opposite from an open end of the interface member 74 that receives the battery pack 30. The illustrated elastomeric members 94 are rubber cylinders that fit within corresponding notches in the interface member 74. The elastomeric members 94 engage the connection portion 46 (FIG. 3) of the battery pack 30 when the battery pack 30 is connected to the interface member 74. In particular, the elastomeric members 94 take up clearances or tolerances between the battery pack 30 and the interface member 74 to preload the latches 62 of the battery pack 30. Such an arrangement creates a relatively tight engagement between the battery pack 30 and the interface member 74 such that the battery pack 30 and the interface member 74 do not move (e.g., vibrate) relative to each other. In some embodiments, the elastomeric members 94 may be omitted.

As shown in FIG. 5, the isolators 78 are positioned between the interface member 74 and the housing 14 to isolate the interface member 74, and thereby the battery pack 30, from the housing 14. In the illustrated embodiment, the isolation system 70 includes six isolators 78. In other embodiments, the isolation system 70 may include fewer or more isolators 78. Each isolator 78 is a generally annular member and is composed of an elastomeric or rubber material, such as polyurethane. In other embodiments, the isolators 78 may have other shapes and configurations and/or may be composed of other suitable materials.

As shown in FIGS. 5 and 6, the isolators 78 are positioned on posts 98, 102 that extend from the interface member 74 and are received in openings 106 formed in the housing 14. The illustrated interface member 74 includes six posts 98 extending from opposing sidewalls 110A, 110B of the member 74, with three posts 98 extending from each sidewall 110A, 110B. In the illustrated embodiment, isolators 78 are only positioned on two of the three posts 98 on each sidewall 110A, 110B, although in other embodiments an isolator 78 may be positioned on every post 98. The interface member 74 also includes an upper projection 114 from which two additional posts 102 extend. The upper projection 114 is located halfway between the opposing sidewalls 110A, 110B and extends perpendicularly from an upper surface 118 (FIG. 6) of the interface member 74. In other embodiments, the isolators 78 may be positioned on posts that extend from the housing 14 and received in openings formed in the interface member 74. The isolators 78 connect the interface member 74 to the housing 14 such that the interface member 74 does not directly contact the housing 14. As such, the interface member 74 and the battery pack 30 are indirectly supported on the battery support portion 42 of the housing 14 through the isolators 78.

Figure 7:
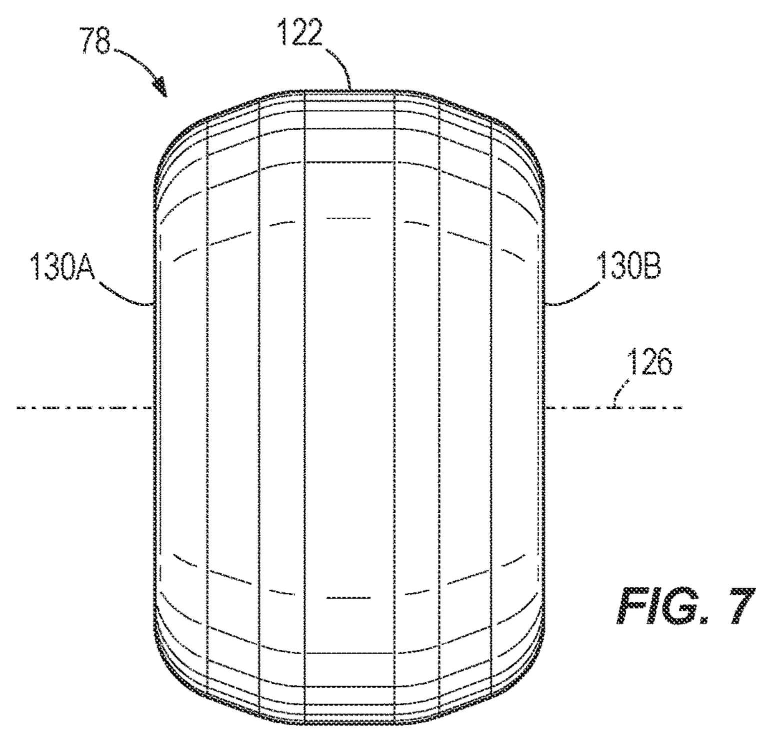
FIG. 7 is a side view of an isolator of the battery pack isolation system.

FIG. 7 illustrates one of the isolators 78 in more detail. The illustrated isolator 78 has a double-taper design. That is, the isolator 78 tapers from its mid portion 122 toward a central longitudinal axis 126 of the isolator 78. The isolator 78 thereby decreases in diameter from the mid portion 122 to both outer faces 130A, 130B (i.e., the diameter at the mid portion 122 of the isolator 78 is greater than the diameter at either outer face 130A, 130B of the isolator 78). The double-taper design provides clearance for the isolator 78 to deflect and deform when the isolator 78 is compressed during operation of the power tool 10 (e.g., when the housing 14 vibrates relative to the interface member 74 and pushes against the isolator 78).

Referring back to FIGS. 4 and 5, the terminal block 82 is mounted to the interface member 74 between the rails 86. The illustrated terminal bock 82 is a separate piece from the interface member 74, but is supported by the interface member 74. In some embodiments, a biasing member (e.g., a coil spring) may be positioned between the terminal block 82 and the interface member 74 to help clamp the terminal block 82 within the member 74. In other embodiments, the terminal block 82 may be integrated into the interface member 74 such that the terminal block 82 and the interface member 74 are a single piece.

The terminal block 82 includes electrical contacts that engage the terminals 58 (FIG. 3) of the battery pack 30 when the battery pack 30 is connected to the interface member 74. The terminal block 82 is electrically coupled to the motor 18 to provide power from the battery pack 30 to the motor 18. Since the terminal block 82 is directly mounted to the interface member 74 and not to the housing 14, the terminal block 82 is also isolated from the housing 14 through the isolators 78 such that vibrations of the power tool 10 are not transferred to the battery pack 30 through the terminal block 82.

The isolation system 70 mechanically isolates the battery pack 30 from the housing 14 of the power tool 10 such that vibrations from the motor 18 and the drive mechanism 22 are not transferred to the battery pack 30 during operation of the power tool 10. Depending on the particular type of power tool, the isolation system 70 may be configured to isolate the battery pack 30 from different frequencies, or ranges of frequencies, of vibrations. For example, the spring rate (e.g., material, shape, etc.) of the isolators 78 may be varied to isolate specific operational frequencies for particular types of power tools. In addition, the shape of each isolator 78 may be changed to vary spring rate, dampening properties, and/or abrasion resistance.

Although the invention has been described with reference to certain preferred embodiments, variations and modifications exist within the scope and spirit of one or more independent aspects of the invention. For example, in further embodiments, the battery pack isolation system 70 may be used with other types of electrical devices that vibrate during operation, such as vacuum cleaners, outdoor power equipment (e.g., blowers, chain saws, edgers, trimmers, lawn mowers, etc.), or vehicles (e.g., automobiles, motorcycles, scooters, bicycles, etc.).

Various features and advantages of the invention are set forth in the following claims.

What is claimed is:

1. A power tool comprising:

a housing including a first portion and a second portion coupled to the first portion;

a motor positioned substantially within the housing between the first portion and the second portion;

a drive mechanism supported within the housing between the first portion and the second portion, the drive mechanism coupled to the motor; and an isolation system including an interface member configured to removably receive a portion of a battery pack to electrically couple the battery pack to the motor, the interface member having opposing sidewalls and an upper wall connecting the opposing side walls, a plurality of protrusions extending from the opposing sidewalls of the interface member, the plurality of protrusions located between the first portion and the second portion, an upper protrusion extending from the upper wall of the interface member, the upper protrusion located between the first portion and second portion of the housing, and elastomeric material adjacent the plurality of protrusions and the upper protrusion to isolate the battery pack from the housing during operation of the power tool.

2. The power tool of claim 1, wherein the interface member further includes two parallel, spaced apart rails configured to slidably receive the battery pack.

3. The power tool of claim 2, wherein the isolation system further includes a terminal block having a plurality of terminal connectors configured to electrically couple to the battery pack.

4. The power tool of claim 3, wherein the terminal block is positioned between the two parallel, spaced apart rails and extends through the upper wall of the interface member.

5. The power tool of claim 1, wherein the plurality of protrusions is received within a plurality of openings formed on the first portion and the second portion of the housing.

6. The power tool of claim 1, wherein the elastomeric material surrounds at least some of the plurality of protrusions.

7. The power tool of claim 1, wherein the elastomeric material surrounds at least a portion of the upper protrusion.

8. A power tool comprising:

a housing including a first portion and a second portion coupled to the first portion;

a motor positioned substantially within the housing between the first portion and the second portion;

a drive mechanism supported within the housing between the first portion and the second portion, the drive mechanism coupled to the motor; and an isolation system configured to allow the housing to move in six degrees of freedom relative to a battery pack, the isolation system including an interface member positioned between the first portion and the second portion and configured to removably receive a portion of the battery pack to electrically couple the battery pack to the motor, and an isolator coupled between the housing and the interface member to isolate the battery pack from the housing during operation of the power tool.

9. The power tool of claim 8, wherein the isolator includes an elastomeric member.

10. The power tool of claim 9, wherein the elastomeric member is a ring.

11. The power tool of claim 8, wherein the interface member has opposing sidewalls and an upper wall connecting the opposing side walls.

12. The power tool of claim 11, wherein the opposing sidewalls include a plurality of protrusions, and wherein the isolator at least partially surrounds the plurality of protrusions.

13. The power tool of claim 8, wherein the interface member includes two parallel, spaced apart rails configured to slidably receive the battery pack.

14. The power tool of claim 13, wherein the isolation system further includes a terminal block with a plurality of terminal connectors configured to electrically couple to the battery pack.

15. The power tool of claim 14, wherein the terminal block is positioned between the two parallel, spaced apart rails.

16. A power tool comprising:

a housing including a first portion and a second portion coupled to the first portion;

a motor positioned substantially within the housing between the first portion and the second portion;

a drive mechanism supported within the housing between the first portion and the second portion, the drive mechanism coupled to the motor; and an isolation system including an interface member configured to removably receive a portion of a battery pack to electrically couple the battery pack to the motor, the interface member having opposing sidewalls, an upper wall connecting the opposing sidewalls, and a set of parallel, spaced-apart rails configured to slidably receive the battery pack, a terminal block that electrically couples the battery pack to the motor, the terminal block extending through the upper wall of the interface member, the terminal block positioned between the set of parallel, spaced-apart rails, and elastomeric material adjacent the opposing sidewalls and the upper wall, wherein the opposing sidewalls of the interface member include a plurality of protrusions.

17. The power tool of claim 16, wherein the elastomeric material at least partially surrounds the plurality of protrusions.

18. The power tool of claim 16, wherein the plurality of protrusions is received within a plurality of openings formed on the first portion and the second portion of the housing.

19. The power tool of claim 16, wherein the elastomeric material includes a plurality of rings.

* * * * *